US009009282B2

(12) United States Patent
Bui et al.

(10) Patent No.: US 9,009,282 B2
(45) Date of Patent: Apr. 14, 2015

(54) METHOD FOR SYNCHRONIZING A CLIENT CLOCK FREQUENCY WITH A SERVER CLOCK FREQUENCY

(75) Inventors: Dinh Thai Bui, Nozay (FR); Michel Le Pallec, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 253 days.

(21) Appl. No.: 13/375,960

(22) PCT Filed: Jul. 22, 2010

(86) PCT No.: PCT/EP2010/060660
§ 371 (c)(1),
(2), (4) Date: Jan. 5, 2012

(87) PCT Pub. No.: WO2011/012535
PCT Pub. Date: Feb. 3, 2011

(65) Prior Publication Data
US 2012/0102234 A1 Apr. 26, 2012

(30) Foreign Application Priority Data
Jul. 31, 2009 (EP) .................................. 09167021

(51) Int. Cl.
*G06F 15/173* (2006.01)
*H04J 3/06* (2006.01)
(52) U.S. Cl.
CPC .................................. *H04J 3/0664* (2013.01)
(58) Field of Classification Search
USPC ................. 709/248, 203, 217, 223, 224, 229; 370/350, 503, 516
See application file for complete search history.

(56) References Cited

U.S. PATENT DOCUMENTS

| 7,315,546 | B2 * | 1/2008 | Repko et al. ............. 370/395.62 |
| 7,613,268 | B2 * | 11/2009 | Aweya et al. ................. 375/376 |
| 7,656,985 | B1 * | 2/2010 | Aweya et al. ................. 375/373 |

(Continued)

FOREIGN PATENT DOCUMENTS

| EP | 1339182 A2 | 8/2003 |
| EP | 2026485 A1 | 2/2009 |

OTHER PUBLICATIONS

Qiong Li et al., "The Implication of Short-Range Dependency on Delay Variation Measurement," Proceedings of the Second IEEE International Symposium on Network Computing and Applications, IEEE, 2003.

(Continued)

*Primary Examiner* — Lashonda Jacobs
(74) *Attorney, Agent, or Firm* — Harness, Dickey & Pierce

(57) ABSTRACT

A method for synchronizing the frequency of a client clock with a server clock frequency, such synchronization being performed through timing packets transmitted by the server towards the client through a telecommunication network wherein the method includes the transmission, by the server, of groups of timing packets such that an emission timing packet period ($\tau_1$), measured between successive timing packets of a same group, is smaller than an emission group period ($\tau_3$), measured between first timing packets of successive groups. Emission timing packet period ($\tau_1$) is such that transmission delays of timing packets within a same group are practically correlated, and emission group period ($\tau_3$) is such that transmission delays of timing packets from different groups are practically uncorrelated.

10 Claims, 1 Drawing Sheet

(56) References Cited

U.S. PATENT DOCUMENTS

| | | | |
|---|---|---|---|
| 7,747,725 B2 * | 6/2010 | Williams et al. | 709/223 |
| 7,916,758 B2 * | 3/2011 | Sun et al. | 370/503 |
| 2002/0141452 A1 * | 10/2002 | Mauritz et al. | 370/503 |
| 2003/0056136 A1 * | 3/2003 | Aweya et al. | 713/400 |
| 2003/0156569 A1 * | 8/2003 | Kawakami et al. | 370/345 |
| 2003/0174734 A1 * | 9/2003 | Compton et al. | 370/503 |
| 2004/0071168 A1 * | 4/2004 | Julyan | 370/503 |
| 2004/0103226 A1 * | 5/2004 | Johnson et al. | 710/52 |
| 2004/0170169 A1 * | 9/2004 | Swoboda et al. | 370/389 |
| 2004/0264477 A1 * | 12/2004 | Repko et al. | 370/395.62 |
| 2005/0041692 A1 | 2/2005 | Kallstenius | |
| 2006/0156065 A1 * | 7/2006 | Glass | 714/18 |
| 2006/0221936 A1 * | 10/2006 | Rauchwerk | 370/352 |
| 2006/0280182 A1 * | 12/2006 | Williams et al. | 370/394 |
| 2007/0025399 A1 * | 2/2007 | Keating | 370/519 |
| 2007/0147435 A1 * | 6/2007 | Hamilton et al. | 370/503 |
| 2009/0052431 A1 * | 2/2009 | Kroener et al. | 370/350 |
| 2009/0067837 A1 * | 3/2009 | Hesse et al. | 398/51 |
| 2009/0276542 A1 * | 11/2009 | Aweya et al. | 709/248 |
| 2010/0085989 A1 * | 4/2010 | Belhadj et al. | 370/503 |
| 2010/0158051 A1 * | 6/2010 | Hadzic et al. | 370/503 |
| 2010/0161723 A1 * | 6/2010 | Bryce et al. | 709/203 |
| 2011/0128976 A1 * | 6/2011 | Barry et al. | 370/478 |
| 2012/0280714 A1 * | 11/2012 | Silverman et al. | 326/93 |
| 2012/0320794 A1 * | 12/2012 | Belhadj et al. | 370/254 |
| 2013/0301660 A1 * | 11/2013 | Barry et al. | 370/519 |

OTHER PUBLICATIONS

International Search Report for International Application No. PCT/EP2010/060660 filed Jul. 22, 2010.

* cited by examiner

METHOD FOR SYNCHRONIZING A CLIENT CLOCK FREQUENCY WITH A SERVER CLOCK FREQUENCY

CROSS-REFERENCE TO RELATED APPLICATIONS

This application is a national stage entry of PCT application PCT/EP2010/060660 filed on Jul. 22, 2010, which claims the benefit of EP Application No. 09167021.6 filed in the European Patent Office on Jul. 31, 2009, the disclosures of each of which are hereby incorporated by reference in their entirety.

BACKGROUND

1. Field

The invention relates to a method for synchronizing a client clock frequency with a server clock frequency.

2. Related Art

A telecommunication system might comprise a server, also named "master" thereafter, and clients, also named as "slaves" thereafter, within a packet switched network. In order to synchronize a slave clock frequency with a reference frequency of the master clock—i.e. to syntonize the slave with the master—it is known to transmit periodic timing packets from the server to the clients.

SUMMARY

In this case, as represented in FIG. 1, a slave might use a two stages syntonization process:
- On a first stage 12, a filtering (or ranging) of incoming packets is performed in order to select timing packets for frequency synchronization, and
- On a second stage 14, selected timing packets are used to discipline the slave oscillator frequency.

More precisely, the timing packet filtering at the first stage can be performed in two steps wherein, firstly, a measure 16 of the time difference between successive timing packet arrival times—thereafter called timing packet inter-arrival period—is performed and, secondly, a filter 18 is applied to such inter-arrival periods.

Assessment of inter-arrival periods is generally implemented on the assumption that the stochastic distribution function of timing packet transmission delays—such delays being the time intervals for timing packets to be transmitted from the master to the slave—is independent of previous timing packets transmissions (i.e. uncorrelated) and identically distributed so that methods as the Moving Average (MA) or the Exponentially Weighted Moving Average (EWMA) can be implemented on a large number of inter-arrival periods to determine a mean value thereof.

Disappointingly, the MA method has the disadvantage of requiring a very large number of values to achieve stringently low jitter levels in the recovered clock signal. As a consequence, an important number of registers is required with the related costs.

The EWMA partially solves this issue at the expense of being very sensitive to the correlation between successive packet transmission delays. Indeed, the aforementioned assumption on independency (i.e. no correlation) between timing packet transmission delays is not realistic as it has been observed that packet transmission delays are mutually more or less dependent (i.e. correlated) in time.

On that basis, EWMA method becomes rapidly inefficient as the correlation between the transmission delays of successive timing packet increase, as demonstrated by J. Aweya, D. Y. Montuno, M. Ouellette and K. Felske in "Analysis of a clock-recovery technique for circuit emulation services over packet networks", International journal of communication systems, 2008.

To summarize, for some deployment constraints, such as a targeted small convergence time, it is required an increase in timing packet emission frequency—i.e. a shorter inter-arrival period. Problematically, such shorter inter-arrival period induces strong delay correlation between successive timing packets which apparently decreases the clock frequency stability as disclosed by Q. Li, D. L. Mills—The Implication of Short-Range Dependency on Delay Variation Measurement, IEEE Network Computing and Applications. 2003, referred to thereafter as Q. Li and D. L. Mills publication.

The invention aims to solve this problem by providing a method which allows syntonization with both small convergence time and stability for the recovered clock signal, while having a limited effect in the consumed bandwidth for frequency synchronization.

For that purpose, the invention relates to a method for synchronizing the frequency of a client clock with a server clock frequency, such synchronization being performed through timing packets transmitted by the server towards the client through a telecommunication network, characterized in that it comprises the transmission by the server of groups of timing packets whereby an emission timing packet period, measured between successive timing packets of a same group, is smaller than an emission group period, measured between first timing packets of successive groups, Emission timing packet period being such that transmission delays of timing packets within same groups are practically correlated, and Emission group period being such that transmission delays of timing packets from different groups are practically uncorrelated.

The invention provides thereby a method which delivers small convergence time since inter-arrival periods of timing packets, measured within groups, is relatively constant and relatively less noisy.

Thus a precise estimated value of the master distributed frequency can quickly be derived on the basis of such inter-arrival periods.

Also, the method provides stability to the recovered clock signal since different groups are separated from each other with a sufficient group time interval so that the delay distribution functions of timing packets from different groups are practically not correlated.

In one embodiment, the client uses an average of timing packets inter-arrival times, measured between successive timing packets within a group, to estimate a distributed reference frequency.

In this case, the client might use an average of group inter-arrival times, measured between first timing packets of successive groups, to estimate the distributed reference frequency through a weighted equation such as:

$$\tau_{est} = a \times \frac{\langle \tau_1 \rangle}{N} + (1-a) \times \frac{\langle \tau_3 \rangle}{M}$$

Wherein N and M are integers, "a" is a weighting coefficient, $\langle \tau_1 \rangle$ is an average of timing packets inter-arrival times, $\langle \tau_3 \rangle$ is an average of group inter-arrival times and $1/\tau_{est}$ is an estimation of the distributed reference frequency.

In one embodiment, each group comprises a pair of timing packets so that, for instance, to achieve a given timing packet bandwidth equivalent to a periodic transmission of timing packets with a period of T, the emission timing packet period $\tau_1$ and the emission group packet period $\tau_3$ are such that:

$$\tau_3 = 2 \times T = \tau_1 + \tau_2$$

Wherein $\tau_2$ is an emission period measured between the last timing packet of a group and the first timing packet of a successive group.

In one embodiment, a function is used to determine the emission timing packet period and/or the emission group period according to monitored queuing effects in the transmission of the timing packets between the server and the client. For instance the queuing effects are monitored according to a Deviation Lag function (DLF).

In one embodiment, groups of timing packets are transmitted by sets so that the emission group period is smaller than an emission set period, measured between successive sets of groups.

The invention also relates to a server comprising a clock aimed to synchronized in frequency a client clock through timing packets transmitted via a telecommunication network, characterized in that it comprises means for transmitting groups of timing packets whereby an emission timing packet period, measured between successive timing packets of a same group, is smaller than an emission group period, measured between first timing packets of successive groups, Emission timing packet period being such that transmission delays of timing packets within a same group are practically correlated, and Emission group period being such that transmission delays of timing packets from different groups are practically uncorrelated according to a method defined by any of the previous embodiments.

The invention also relates to a client/terminal comprising a clock to be frequency synchronized through timing packets transmitted by a server clock through a telecommunication network, characterized in that it comprises means for filtering and using groups of timing packets for synchronization whereby measured timing packets inter-arrival periods, measured between successive timing packets within a same group, are smaller than group inter-arrival periods, measured between first timing packets of successive groups, Transmission delays of timing packets within a same group being practically correlated, and Transmission delays of timing packets from different groups being practically uncorrelated,
according to a method defined by any of the previous embodiments.

Finally, the invention also relates to a sequence of timing packets transmitted by a server towards a client through a telecommunication network, characterized in that it presents groups of timing packets whereby an emission timing packet period, measured between successive timing packets within a same group, is smaller than a group period, measured between successive groups of timing packets, Timing packet period being such that transmission delays of timing packets within a same group are practically correlated, and Group period being such that transmission delays of timing packets from different groups are practically uncorrelated.

BRIEF DESCRIPTION OF THE DRAWINGS

The foregoing aspects and many of the attendant advantages of this invention will become more readily appreciated as the same becomes better understood by reference to the following detailed description when taking in conjunction with the accompanying drawings which represent.

DETAILED DESCRIPTION OF EXAMPLE EMBODIMENTS

Figure 1:
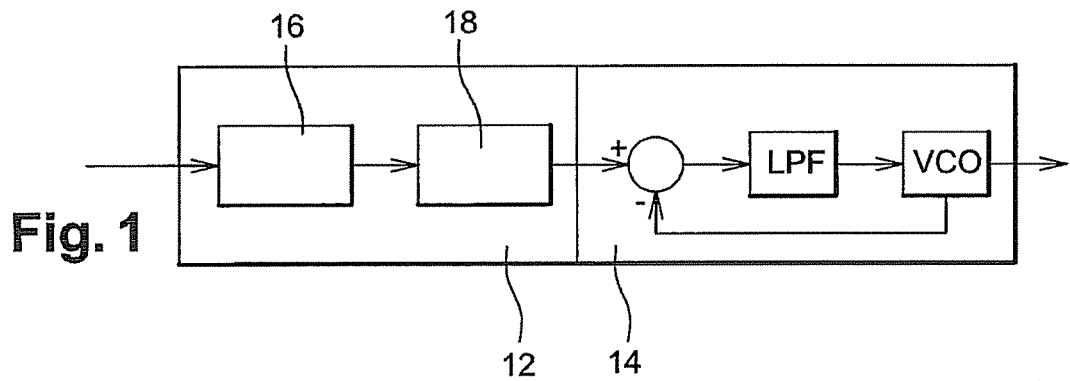
FIG. 1, already described, illustrates a typical architecture of a packet slave clock.
Figure 2:
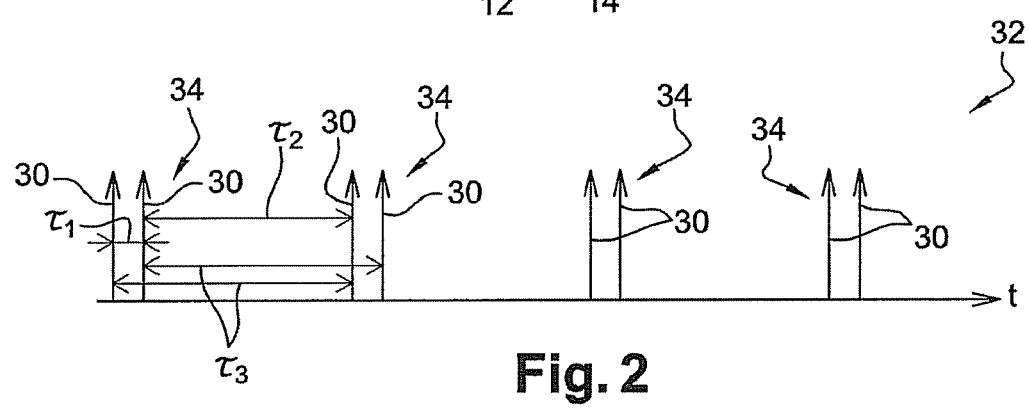
FIG. 2, a timing packet emission profile according to a first embodiment of the invention, FIG. 3, a periodic timing packet emission profile whose bandwidth is equivalent to the bandwidth of the flow profile depicted in FIG. 2, and FIG. 4, a timing packet emission profile according to a second embodiment of the invention.

As represented in FIG. 2, an emission profile 32 of timing packets 30 aimed at synchronizing the frequency of a slave clock with a master clock frequency accordingly to the invention presents an emission profile comprising groups 34 of timing packets 30, an emission timing packet period $\tau_1$ measured between successive timing packets 30 of a same group 34 being smaller than an emission group period $\tau_3$ measured between successive groups 34.

On that basis, a method according to the invention can take advantage of the emission timing packet period $\tau_1$ to allow, at the slave level, a quick convergence towards an estimation of the distributed frequency value.

For that purpose, the emission timing packet period $\tau_1$ is specified in such a way, for instance by using the Deviation Lag function as defined in the aforementioned Q. Li and D. L. Mills's publication, so that timing packets 30 of a same group 34 undergo the same PDV (Packet Delay Variation)—i.e. the same buffering/queuing effects—during their transmission. Thus, the difference between their respective transmission delays is practically quasi null.

This provides a great accuracy as demonstrated thereafter when considering groups 34 comprising a pair of timing packets 30 and, for a given message "i", the following parameters:

$t_{Si}$ the message reception time measured by the slave clock using the slave local timescale, $t_{Mi}$ the message departure time measured by the master clock, $d_{MSi}$ the message transmission delay from the master to the slave, $\text{off}_{Si}$ the time offset between the slave clock and the master clock, $\text{er}_{Si}$ the measurement error due to the slave clock frequency skew and frequency drift, as defined in the IETF documents RFCs 2330 and 3393, and $T_0$ the message transmission period related to the timing packet rate.

By definition, the reception time $t_{Si}$ measured by the slave clock results from the equation:

$$t_{Si} = t_{Mi} + d_{MSi} + \text{off}_{Si} + \text{er}_{Si}.$$

Thus, a difference between two reception times of successive timing packets "i" and "i+1" results from the equation:

$$t_{Si+1} - t_{Si} = (t_{Mi+1} - t_{Mi}) + (d_{MSi+1} - d_{MSi}) + (\text{off}_{Si+1} - \text{off}_{Si}) + (\text{er}_{Si+1} - \text{er}_{Si})$$

with:

$$t_{Mi+1} - t_{Mi} = T_0,$$

$$d_{MSi+1} - d_{MSi} = \text{PDV}_{i+1} - \text{PDV}_i$$

The latter expression corresponds to the difference between the PDV of 2 successive timing packets. Considering that the expression (off$_{Si+1}$−off$_{Si}$) equals zero as the offset correction is not performed between successive packets during the packet filtering period, it appears that:

$$er_{Si+1} - er_{Si} \approx \alpha \times T_0 + \beta \times T_0^2$$

as defined in the standard RFC 3393, α and β being two real coefficients very reduced (for instance β∝10$^{-6}$). Thus the client measures:

$$t_{Si+1} - t_{Si} = T_0 + (PDV_{i+1} - PDV_i) + \alpha \times T_0 + \beta \times T_0^2$$

so that the measurement error in the difference between the two reception times is:

$$(PDV_{i+1} - PDV_i) + \alpha \times T_0 + \beta \times T_0^2$$

To conclude, transmission delays are practically correlated for timing packets within a group so that this error becomes negligible, the expression "PDV$_{i+1}$−PDV$_i$" and "α×T$_0$+β×T$_0^2$" being practically negligible versus such transmission delays.

FIG. 2 illustrates a timing packet emission profile 32 according to one possible embodiment of the invention wherein:

Each group 34 comprises a pair of timing packets 34 separated from each other by an emission timing packet period τ$_1$, and Two successive groups 34 are separated by an emission group period τ$_3$, measured between first timing packets of successive groups, such emission periods τ$_1$ for timing packets and τ$_3$ for groups being such that transmission delays of timing packets 30 of different groups are practically not, or less, correlated whereas transmission delays of timing packets 30 within same groups are practically correlated.

To keep the same bandwidth usage as an original flow profile (FIG. 3) based on a T period of emission, parameters of the new profile should comply with the following relationships:

$$\tau_3 = 2 \times T = \tau_1 + \tau_2$$

Wherein τ$_2$ is an emission period measured between the last timing packet of one group 34 and the first timing packet of the successive—i.e. following—group 34.

Practically, the emission timing packet period τ$_1$ can be defined using different network engineering methods to measure correlation, as for example the Deviation Lag Function (DLF) plot as explained in Q. Li and Mills publication mentioned above. In any case, it depends on the queuing effect periods along the path between the master and the slave.

As a consequence, a frequency computed on timing packets of a same group is particularly accurate since such timing packets have undergone the same queuing PDV (Packet Delay Variation) effects.

In this embodiment, a slave considers an average of timing packets inter-arrival times in order to compute an estimation of the emission timing packet period τ$_1$ and to determine the master reference frequency.

Practically, the slave estimates the master clock frequency by computing an average <τ$_1$> of timing packets inter-arrival periods, with or without an average <τ$_3$> (or alternately <τ$_2$>) of the group inter-arrival periods. Indeed, the slave may decide at any time to make use of only <τ$_1$> to compute an estimation of the reference frequency or to use both <τ$_1$> and <τ$_3$>—for instance through a weighted value as explained hereunder.

For that purpose the estimated reference frequency might be defined as 1/τ$_{est}$ wherein:

$$\tau_{est} = a \times \frac{\langle \tau_1 \rangle}{N} + (1-a) \times \frac{\langle \tau_3 \rangle}{M}$$

"a" being a weighting coefficient between the two averages whose can vary with time depending on the needs of the slave clock ranging mechanism.

It is however important to note that the average value <τ$_1$> of the timing packet inter-arrival times is generally sufficiently accurate per se for the following reasons:

The timing packets of a same group undergo the same PDV (Packet Delay Variation) so that the difference between their respective delay is practically inexistent, The time interval between different groups is twice a known time interval i.e. τ$_3$=2×T.

Figure 3:
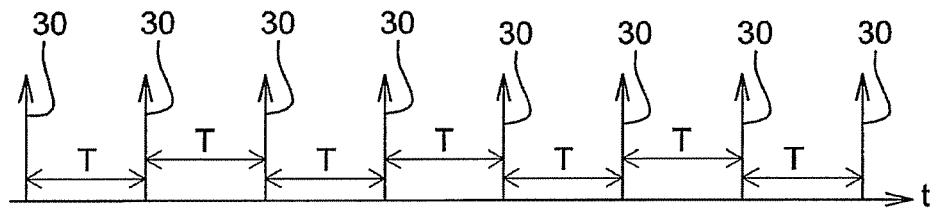

Thus, the correlation between the different group inter-arrival periods can be considered as small and, in any case, smaller than between successive packets transmission delays in a periodic profile as depicted in FIG. 3.

The invention can be easily implemented by adapting the timing packet transmission of currently existing master-slave clock hierarchy.

Figure 4:
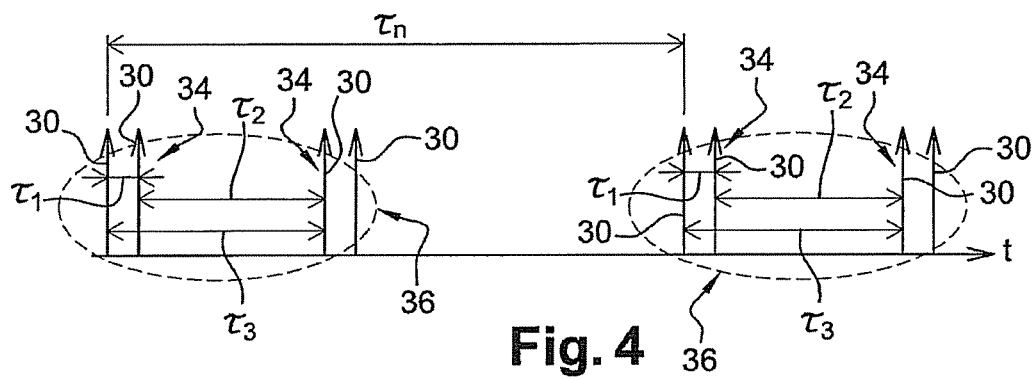

The invention can be embedded in a plurality of embodiments. For instance, groups of three or more timing packets might be used as illustrated in FIG. 4 wherein groups 34 are transmitted by sets 36 so that the time period between successive groups 34 of timing packets is smaller than the time period between successive sets of groups.

In this case, the invention is performed considering three time intervals (τ$_1$, τ$_3$, τ$_n$) in order to take into account packet delay correlations induced by different causes (delay variation due to processing time, delay variation caused by queuing/buffering, etc)

For instance, assuming timing packets length of 1000 bits on a 100 Mbits/s transmission line, a method according to the invention could combine timing packet periods of 5 ms (strong queuing correlation), group periods of 50 ms (limited traffic correlation due to some data application intensive usage) and set periods of 150 ms (independent packet delays).

According to another embodiment, the client uses Deviation Lag Function (DLF) plots as explained in Q. Li and D. L. Mills publication so that the timing packet transmission delay monitoring takes into account queuing effects along the path between the master and the slave in order to determine timing packet periods and group periods with respect to the correlation/no correlation condition.

Finally, it must be underlined that the correlation/uncorrelation of timing packets/groups according to the invention can be adapted according to a quality and/or performance of the considered network. In other words, for instance, the invention could be implemented with emission, or inter-arrival, timing packets periods—within a same group—being more strongly correlated than emission, or inter-arrival, group period.

In that case, timing packets are said to be strongly-correlated and groups are said to be uncorrelated or loosely correlated.

The invention claimed is:

1. Method for synchronizing a frequency of a client clock with a server clock frequency, such synchronization being performed through timing packets transmitted by the server towards the client through a telecommunication network, wherein the method comprises:

transmission, by the server, of groups of timing packets such that an emission timing packet period (τ$_1$) is smaller than an emission group period (τ$_3$), the emission timing packet period ($\tau_1$) being a period of time between transmissions of successive timing packets within individual groups of timing packets from among the groups of timing packets, the emission group period ($\tau_3$) being a period of time between transmissions of the timing packets that are transmitted first from each of successive groups from among the groups of timing packets, the emission timing packet period ($\tau_1$) being such that transmission delays of timing packets within a same group are practically correlated, and the emission group period ($\tau_3$) being such that transmission delays of timing packets from different groups are practically uncorrelated.

2. Method according to claim 1, further comprising:
using, by the client, an average ($<\tau_1>$) of timing packets inter-arrival times, measured between successive timing packets within a group, to estimate a distributed reference frequency ($1/\tau_{est}$).

3. Method according to claim 2, further comprising:
using, by the client, an average ($<\tau_3>$) of group inter-arrival times, measured between first timing packets of successive groups, to estimate the distributed reference frequency ($1/\tau_{est}$) through a weighted equation such as:

$$\tau_{est} = a \times \frac{\langle \tau_1 \rangle}{N} + (1-a) \times \frac{\langle \tau_3 \rangle}{M}$$

wherein N and M are integers, "a" is a weighting coefficient, $<\tau_1>$ is an average of timing packets inter-arrival times, $<\tau_3>$ is an average of group inter-arrival times and $1/\tau_{est}$ is an estimation of the distributed reference frequency.

4. Method according to claim 1 wherein each group comprises a pair of timing packets.

5. Method according to claim 4 wherein, to achieve a given timing packet bandwidth equivalent to a periodic transmission of timing packets with a period of T, the emission timing packet period $\tau_1$ and the emission group packet period $\tau_3$ are such that:

$$\tau_3 = 2 \times T = \tau_1 + \tau_2$$

wherein $\tau_2$ is an emission period measured between the last timing packet of a first group and the first timing packet of a successive group.

6. Method according to claim 1 wherein a function is used to determine the emission timing packet period ($\tau_1$) and/or the emission group period ($\tau_3$) according to monitored queuing effects in the transmission of the timing packets between the server and the client.

7. Method according to claim 6 wherein the queuing effects are monitored according to a Deviation Lag function (DLF).

8. Method according to claim 1 wherein groups of timing packets are transmitted by sets so that the emission group period ($\tau_3$) is smaller than an emission set period, measured between successive sets of groups.

9. A server comprising:
a clock aimed to synchronize in frequency a client clock through timing packets transmitted via a telecommunication network,
wherein the server is configured to transmit groups of timing packets such that an emission timing packet period ($\tau_1$) is smaller than an emission group period ($\tau_3$),
the emission timing packet period ($\tau_1$) being a period of time between transmissions of successive timing packets within individual groups of timing packets from among the groups of timing packets,
the emission group period ($\tau_3$) being a period of time between transmissions of the timing packets that are transmitted first from each of successive groups from among the groups of timing packets,
the emission timing packet period ($\tau_1$) being such that transmission delays of timing packets within a same group are practically correlated, and
the emission group period ($\tau_3$) being such that transmission delays of timing packets from different groups are practically uncorrelated.

10. A client terminal comprising:
a clock to be frequency synchronized through timing packets transmitted by a server clock through a telecommunication network,
wherein the client is configured to filter and use groups of timing packets for synchronization such that timing packets inter-arrival periods are smaller than group inter-arrival periods,
each timing packet inter-arrival periods being a period of time between transmissions of successive timing packets within individual groups of timing packets from among the groups of timing packets,
each group inter-arrival period being a period of time between transmissions of the timing packets that are transmitted first from each of successive groups from among the groups of timing packets,
the timing packets inter-arrival periods being such that transmission delays of timing packets within a same group being practically correlated, and
the group inter-arrival periods being such that transmission delays of timing packets from different groups being practically uncorrelated.

\* \* \* \* \*